(12) United States Patent
Li et al.

(10) Patent No.: US 12,408,112 B2
(45) Date of Patent: *Sep. 2, 2025

(54) USER EQUIPMENT INVOLVED IN POWER SAVING

(71) Applicant: Panasonic Intellectual Property Corporation of America, Torrance, CA (US)

(72) Inventors: Hongchao Li, Langen (DE); Hidetoshi Suzuki, Kanagawa (JP); Quan Kuang, Frankfurt (DE); Ankit Bhamri, Rödermark (DE); Yihui Li, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,580

(22) Filed: Jun. 7, 2024

(65) Prior Publication Data
US 2024/0323852 A1    Sep. 26, 2024

Related U.S. Application Data

(63) Continuation of application No. 17/315,057, filed on May 7, 2021, now Pat. No. 12,047,880, which is a
(Continued)

(30) Foreign Application Priority Data

Jan. 10, 2019    (EP) .................................... 19151255

(51) Int. Cl.
*H04L 5/00*    (2006.01)
*H04W 52/02*   (2009.01)
*H04W 72/23*   (2023.01)

(52) U.S. Cl.
CPC ....... *H04W 52/0235* (2013.01); *H04W 72/23* (2023.01)

(58) Field of Classification Search
CPC ............. H04W 52/0235; H04W 72/23; H04W 52/0212; H04W 72/232; H04W 76/28;
(Continued)

(56) References Cited

U.S. PATENT DOCUMENTS 12,047,880 B2 *    7/2024    Li .......................... H04W 72/23
2012/0213137 A1    8/2012    Jeong et al.
(Continued)

FOREIGN PATENT DOCUMENTS

CN    110582974 A    12/2019
EP    4124144 A1     1/2023
(Continued)

OTHER PUBLICATIONS

Chinese Office Action dated May 29, 2024, for the corresponding Chinese Patent Application No. 201980076128.7, 23 pages. (With English Translation).
(Continued)

*Primary Examiner* — Joseph E Dean, Jr.
(74) *Attorney, Agent, or Firm* — Seed Intellectual Property Law Group LLP

(57) ABSTRACT

The present disclosure relates to a user equipment (UE), which comprises a receiver, which in operation, receives power saving signals, PoSS, from a serving base station on which the UE is camping, processing circuitry, which, in operation, monitors the reception of PoSS to determine a UE behavior regarding processing of a physical downlink control channel, PDCCH, wherein the POSS comprises a behavior indication indicating for the UE to follow a first behavior or a second behavior, and wherein the POSS further comprises a configuration indication indicating at least one
(Continued)

configuration parameter associated with the first or second behavior, and wherein the processing circuitry, in operation, determines to perform PDCCH monitoring in case the first behavior is indicated and to skip PDCCH monitoring in case the second behavior is indicated, and accordingly applies the at least one configuration parameter.

10 Claims, 7 Drawing Sheets

Related U.S. Application Data continuation of application No. PCT/EP2019/084635, filed on Dec. 11, 2019.

(58) Field of Classification Search
CPC ..... Y02D 30/70; H04L 1/1861; H04L 5/0048; H04L 5/0053
See application file for complete search history.

(56) References Cited

U.S. PATENT DOCUMENTS

| | | |
|---|---|---|
| 2015/0358998 A1 | 12/2015 | Golitschek Edler Von Elbwart et al. |
| 2016/0373287 A1 | 12/2016 | Davydov et al. |
| 2018/0192371 A1 | 7/2018 | Jung et al. |
| 2018/0279223 A1 | 9/2018 | Kim et al. |
| 2019/0297577 A1 | 9/2019 | Lin et al. |
| 2020/0029315 A1 | 1/2020 | Lin et al. |

FOREIGN PATENT DOCUMENTS

| | | |
|---|---|---|
| RU | 2653483 C2 | 5/2018 |
| WO | WO 2018204886 A1 | 11/2018 |

OTHER PUBLICATIONS

3GPP, "3rd Generation Partnership Project; Technical Specification Group Radio Access Network; NR; Multiplexing and channel coding (Release 15)," 3GPP TS 38.212 v15.2.0, Jun. 2018. (98 Pages).
3GPP, "3rd Generation Partnership Project; Technical Specification Group Radio Access Network; NR; NR and NG-RAN Overall Description; Stage 2 (Release 15)," 3GPP TS 38.300 v15.2.0, Jun. 2018. (87 Pages).
3GPP, "3rd Generation Partnership Project; Technical Specification Group Radio Access Network; NR; Physical channels and modulation (Release 15)," 3GPP TS 38.211 v15.2.0, Jun. 2018. (96 Pages).
3GPP, "3rd Generation Partnership Project; Technical Specification Group Radio Access Network; NR; Physical channels and modulation (Release 15)," 3GPP TS 38.211 v15.3.0, Sep. 2018 (96 Pages).
3GPP, "3rd Generation Partnership Project; Technical Specification Group Radio Access Network; NR; Physical layer measurements (Release 15)," 3GPP TS 38.215 v15.3.0, Sep. 2018 (15 Pages).
3GPP, "3rd Generation Partnership Project; Technical Specification Group Radio Access Network; Study on new radio access technology: Radio access architecture and interfaces (Release 14)," 3GPP TR 38.801 v14.0.0, Mar. 2017 (91 Pages).
3GPP, "3rd Generation Partnership Project; Technical Specification Group Radio Access Network; Study on New Radio Access Technology; Radio Interface Protocol Aspects (Release 14)," 3GPP TR 38.804 v14.0.0, Mar. 2017 (57 Pages).
3GPP, 3rd Generation Partnership Project; Technical Specification Group Radio Access Network; Study on Scenarios and Requirements for Next Generation Access Technologies (Release 15), 3GPP TR 38.913 v15.0.0, Jun. 2018. (39 Pages).
CATT, "Status Report to TSG," RP-182355, Agenda Item: 9.3.7, 3GPP TSG RAN meeting #82, Sorrento, Italy, Dec. 10-13, 2018, 23 pages.
CMCC, "Considerations on power saving signal design," R1-1812890, Agenda Item: 7.2.9.2.2. 3GPP TSG RAN WG1 Meeting #95, Spokane, USA, Nov. 12-16, 2018, 5 pages.
English Translation of Russian Office Action, dated Oct. 7, 2022, for Russian Patent Application No. 2021109061/07(019571). (12 pages).
Extended European Search Report, mailed Jun. 6, 2019, for corresponding European Application No. 19151255.7-1219, 13 pages.
Huawei et al., "Design of power saving signal," R1-1812232, Agenda Item: 7.2.9.2.2, 3GPP TSG RAN WG1 Meeting #95, Spokane, USA, Nov. 12-16, 2018, 5 pages.
International Search Report, mailed Jan. 8, 2020, for corresponding International Application No. PCT/EP2019/084635, 4 pages.
Office Action, dated Mar. 24, 2023, for European Patent Application No. 19813909.9. (5 pages).
Qualcomm Incorporated, "Potential phy channel designs for NR unlicensed," R1-1804830, Agenda Item: 7.6.3, 3GPP TSG RAN WG1 Meeting #92bis, Sanya, China, Apr. 16-20, 2018, 8 pages.
Office Action, dated Feb. 11, 2025, for Colombian Patent Application No. NC2021/0008626. (27 pages) (with English Translation).

* cited by examiner

USER EQUIPMENT INVOLVED IN POWER SAVING

BACKGROUND

Technical Field

The present disclosure is directed to methods, devices, and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

Non-limiting and exemplary embodiments facilitate providing improved procedures for saving power in a user equipment.

In one general example, the techniques disclosed here feature a user equipment comprising a receiver, which in operation, receives power saving signals, PoSS, from a serving base station on which the UE is camping, and processing circuitry, which, in operation, monitors the reception of PoSS to determine a UE behavior regarding processing of a physical downlink control channel, PDCCH. The POSS comprises a behavior indication indicating for the UE to follow a first behavior or a second behavior, and wherein the POSS further comprises a configuration indication indicating at least one configuration parameter associated with the first or second behavior, wherein the processing circuitry, in operation, determines to perform PDCCH monitoring in case the first behavior is indicated and to skip PDCCH monitoring in case the second behavior is indicated, and accordingly applies the at least one configuration parameter.

In one general example, the techniques disclosed here feature a method comprising the following steps performed by the UE: Receiving power saving signals, PoSS, from a serving base station on which the UE is camping; monitoring the reception of PoSS to determine a UE behavior regarding processing of a physical downlink control channel, PDCCH; wherein the POSS comprises a behavior indication indicating for the UE to follow a first behavior or a second behavior, and wherein the POSS further comprises a configuration indication indicating at least one configuration parameter associated with the first or second behavior, and wherein the processing circuitry, determines to perform PDCCH monitoring in case the first behavior is indicated and to skip PDCCH monitoring in case the second behavior is indicated, and accordingly applies the at least one configuration parameter.

In one general example, the techniques disclosed here feature a base station, BS, comprising a transmitter, which in operation, transmits power saving signals, PoSS, to at least one user equipment, UE, which is camping on the base station, and processing circuitry, which, in operation, generates the POSS. The POSS comprises a behavior indication indicating for the UE to follow a first behavior or a second behavior, and wherein the POSS further comprises a configuration indication indicating at least one configuration parameter associated with the first or second behavior, wherein the POSS is generated to cause the UE to perform PDCCH monitoring in case the first behavior is indicated and to skip PDCCH monitoring in case the second behavior is indicated, and to accordingly apply the at least one configuration parameter.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
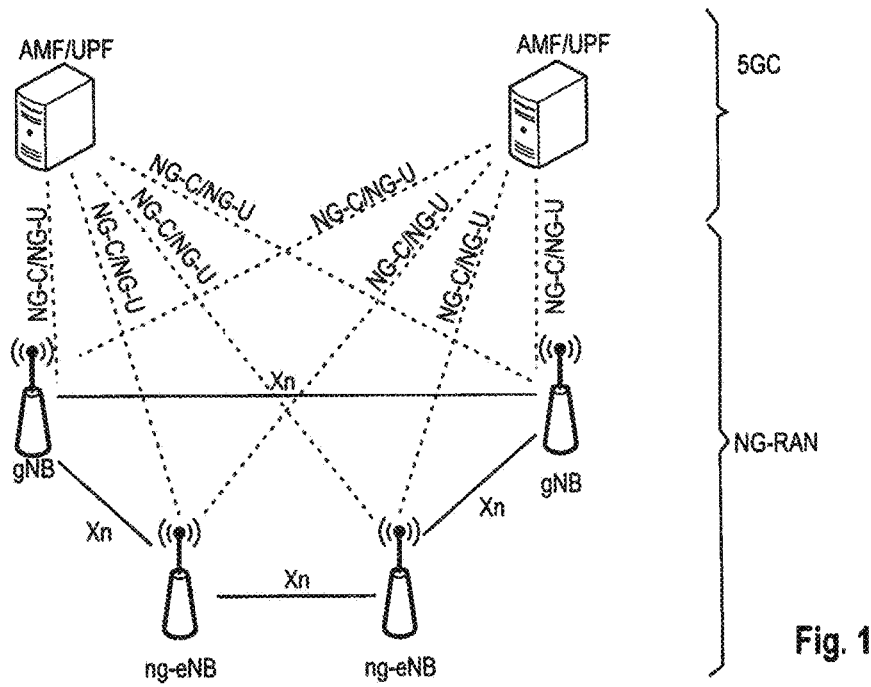
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see e.g., 3GPP TS 38.300 v15.2.0, section 4 incorporated herein by reference).

Figure 2:
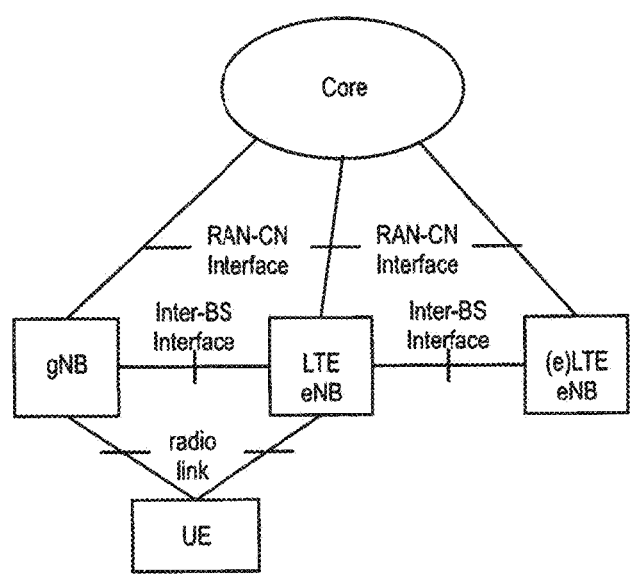
FIG. 2 shows an exemplary user and control plane architecture for the LTE eNB, gNB, and UE.

Various different deployment scenarios can be supported (see e.g., 3GPP TR 38.801 v14.0.0 incorporated herein by reference). For instance, a non-centralized deployment scenario (see e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see e.g., 3GPP TS 38.300 v15.2.0, section 4.4.1 incorporated herein by reference) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g., sub-clause 6.5 of 3GPP TS 38.300 version 15.2.0 incorporated herein by reference). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

For instance, the Medium-Access-Control layer handles logical-channel multiplexing, and scheduling and scheduling-related functions, including handling of different numerologies.

For the physical layer, the MAC layer uses services in the form of transport channels. A transport channel can be defined by how and with what characteristics the information is transmitted over the radio interface. The Random-Access Channel (RACH) is also defined as a transport channel handled by MAC, although it does not carry transport blocks. One of procedures supported by the MAC layer is the Random Access Procedure.

The physical layer (PHY) is, for example, responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within lms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. (See 3GPP TS 38.211 v15.2.0 incorporated herein by reference).

Control Signaling/PDCCH/DCI/Search Spaces

The main purpose of DCI (Downlink Control Information) in 5G NR is the same as DCI in LTE, namely being a special set of information that schedules a downlink data channel (e.g., the PDSCH) or an uplink data channel (e.g., PUSCH). In 5G NR there are a number of different DCI Formats defined (see e.g., TS 38.212 v15.2.0 section 7.3.1 incorporated herein by reference). An overview is given by the following table.

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

PDCCH search spaces are areas in the downlink resource grid (time-frequency resources) where a PDCCH (DCI) may be carried. Put broadly, a radio resource region is used by a base station to transmit control information in the downlink to one or more UEs. The UE performs blind decoding throughout search space trying to find PDCCH data (DCI). Conceptually, the Search Space concept in 5G NR is similar to LTE Search Space, but there are many differences in terms of the details.

Synchronization Signal Block Measurement Timing Configuration—SMTC-PSS/SSS, PBCH NR has introduced the so-called synchronization signal block, SS block (SSB), which comprises a Primary Synchronization Signal (PSS), a Secondary Synchronization Signal (SSS), and a Physical Broadcast CHannel (PBCH). The PSS and SSS can be used by UEs to find, synchronize to and identify a network. The PBCH carries a minimum amount of system information including an indication where the remaining broadcast system information is transmitted.

In LTE, these three signals were also used, the PSS, SSS, and PBCH, although not as being part of one SSB. The three SSB components are always transmitted together in NR, e.g., they have the same periodicity. A given SSB may be repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

The 5G NR PSS is Physical Layer specific signal to identify the radio frame boundary and is type of an m-sequence. The 5G NR SSS is also a Physical-Layer specific signal to identify the subframe boundary and is also an m-sequence. (See e.g., TS 38.211 v15.2.0 section 7.4.2 incorporated herein by reference).

REFERENCE SIGNALS

As in LTE, several different types of reference signals (RS) are used for 5G NR (see 3GPP TS 38.211 v15.3.0 section 7.4.1 incorporated herein by reference). At least the following reference signals are available in 5G NR:
CSI-RS, Channel State Information Reference Signal, usable for channel state information acquisition and beam management.
PDSCH DMRS, DeModulation Reference Signal, usable for the PDSCH demodulation.
PDCCH DMRS, DeModulation Reference Signal, usable for the PDCCH demodulation.
PBCH DMRS, DeModulation Reference Signal, usable for the PBCH demodulation.
PTRS, Phase Tracking Reference Signal, usable for phase tracking the PDSCH.
Tracking Reference Signal, usable for time tracking.

Further, PBCH DMRS can be exemplarily seen as part of the SSB-reference signals (see 3GPP TS 38.215 v15.3.0 section 5.1.1 "SS reference signal received power (SS-RSRP)").

The main differences between reference signals in 5G NR communication systems and reference signals in LTE are that in 5G NR, there is no Cell-specific reference signal, that a new reference signal PTRS has been introduced for time/phase tracking, that DMRS has been introduced for both downlink and uplink channels, and that in NR, the reference signals are transmitted only when it is necessary.

As a DL-only signal, the CSI-RS, which the UE receives, is used to estimate the channel and report channel quality information back to the gNB. During MIMO operations, NR may use different antenna approaches based on the carrier frequency. At lower frequencies, the system uses a modest number of active antennas for MU-MIMO and adds FDD operations. In this case, the UE may use the CSI-RS to calculate the CSI and report it back in the UL direction. The CSI-RS can be further characterized according to the following:

It is used for DL CSI acquisition.
Used for RSRP measurements during mobility and beam management.
Also used for frequency/time tracking, demodulation and UL reciprocity based pre-coding.
CSI-RS is configured specific to UE, but multiple users can also share the same resource.
5G NR standard allows high level of flexibility in CSI-RS configurations, a resource can be configured with up to 32 ports.
CSI-RS resource may start at any OFDM symbol of the slot and it usually occupies 1/2/4 OFDM symbols depending upon configured number of ports.
CSI-RS can be periodic, semi-persistent or aperiodic (due to DCI triggering).
For time/frequency tracking, CSI-RS can either be periodic or aperiodic. It is transmitted in bursts of two or four symbols which are spread across one or two slots.

Quasi-Co-Location (QCL) Concept

The quasi-co-location (QCL) concept is exploited in LTE and NR and may be explained in a simplified manner as follows: If two signals are QCL, it means the UE can assume the same reception/transmission parameter in large scale channel parameters, e.g., Doppler shift, Doppler spread, average delay, delay spread, spatial received parameter and beam orientations. This helps to improve the channel estimation and reception performance.

As mentioned above, conventionally, the UE is performing PDCCH monitoring and blind decoding, which is not always needed, thus unnecessarily wasting energy.

Figure 3A:
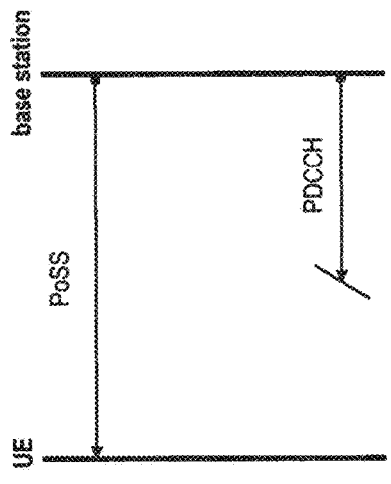
FIGS. 3A and 3B illustrate the messages exchanged between a gNB and a UE when performing a power saving procedure using PoSS.
Figure 3B:
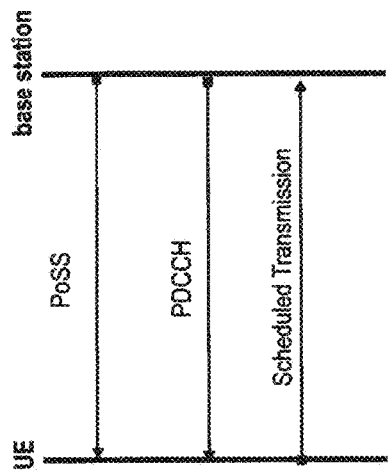

Consequently, the inventors have identified the possibility to reduce the expenditure for PDCCH monitoring and blind decoding by providing a Power Saving Signal, PoSS, which allows for either triggering the UE to monitor PDCCH or to indicate to the UE to skip PDCCH monitoring until a predetermined time point. When the UE skips the PDCCH monitoring, the UE active time can be shortened, which saves power. As illustrated in FIG. 3, the base station sends a PoSS to the UE which generally may cause the UE to follow two different behaviors. In a first behavior, which is shown in FIG. 3A, the POSS indicates to the UE that it should monitor the PDCCH. In this case, the UE receives the PDCCH and sends back a scheduled transmission in accordance with the received PDCCH. On the other hand, if the POSS indicates to the UE to follow a second behavior, the UE skips monitoring the PDCCH as schematically illustrated in FIG. 3B. Thus, the gNB will not transmit any PDCCH to the UE. Even if a PDCCH would be transmitted, the UE would not be able to receive it.

In the following, UEs, base stations, and procedures to meet these needs will be described for the new radio access technology envisioned for the 5G mobile communication systems, but which may also be used in LTE mobile communication system. Different implementations and variants will be explained as well. The following disclosure was facilitated by the discussions and findings as described above and may, for example, be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 4:
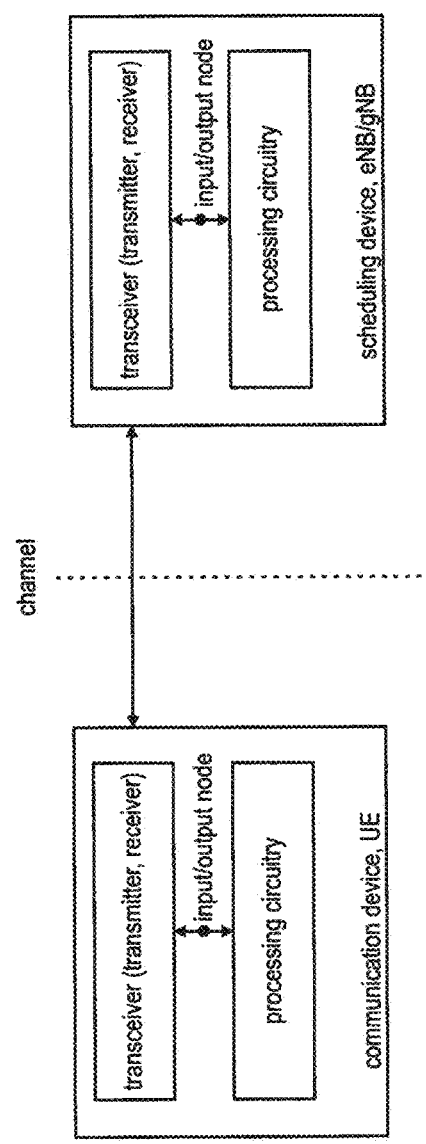
FIG. 4 illustrates the exemplary and simplified structure of a UE and a gNB.

FIG. 4 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

The solutions offered in the following will be described mainly in connection with the 5G NR standardization for the unlicensed operation (e.g., standalone or dual connectivity). Nevertheless, as already hinted at above, the present concepts, ideas and improvements are not restricted to 5G NR Unlicensed standardization but are equally applicable to the licensed operation of 5G NR and also to the unlicensed and/or licensed operation in LTE-(A) communication systems. Also future communication systems may benefit from the concepts disclosed herein.

A first embodiment will be described in the following with regard to FIGS. 5 and 6.

Figure 5:
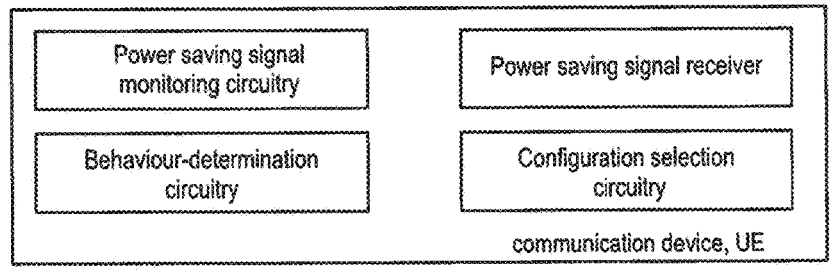
FIG. 5 illustrates a structure of the UE according to an exemplary implementation of a first embodiment.

FIG. 5 illustrates a simplified and exemplary UE structure according to the present solution and can be implemented based on the general UE structure explained in connection with FIG. 4 above. The various structural elements of the UE illustrated in said figure can be interconnected between one another e.g., with corresponding input/output nodes (not shown) e.g., in order to exchange control and user data and other signals. Although not shown for illustration purposes, the UE may include further structural elements.

As apparent therefrom, the UE may include a power saving signal receiver, a power saving signal monitoring circuitry, a behavior determination circuitry, as well as a configuration selection circuitry in order to participate in the improved procedures for reducing the UE power expenditure as will be explained in the following.

In the present case as will become apparent from the below disclosure, the processor (processing circuitry) can thus be exemplarily configured to at least partly perform one or more of the following steps of monitoring for the reception of power saving signals, PoSS, from a serving base station on which the UE is camping, to determine a UE behavior regarding processing of a physical downlink control channel, PDCCH, wherein the POSS comprises a behavior indication indicating for the UE to follow a first behavior or a second behavior, and wherein the POSS further comprises a configuration indication indicating at least one configuration parameter associated with the first or second behavior. The processor determines to perform PDCCH monitoring in case the first behavior is indicated and to skip PDCCH monitoring in case the second behavior is indicated, and accordingly applies the at least one configuration parameter.

The receiver can in turn be configured to be able to at least partly perform one or more of the following steps of receiving the power saving signals, and of receiving information on the threshold values via system information or configuration messages (such as of the RRC protocol).

Figure 6:
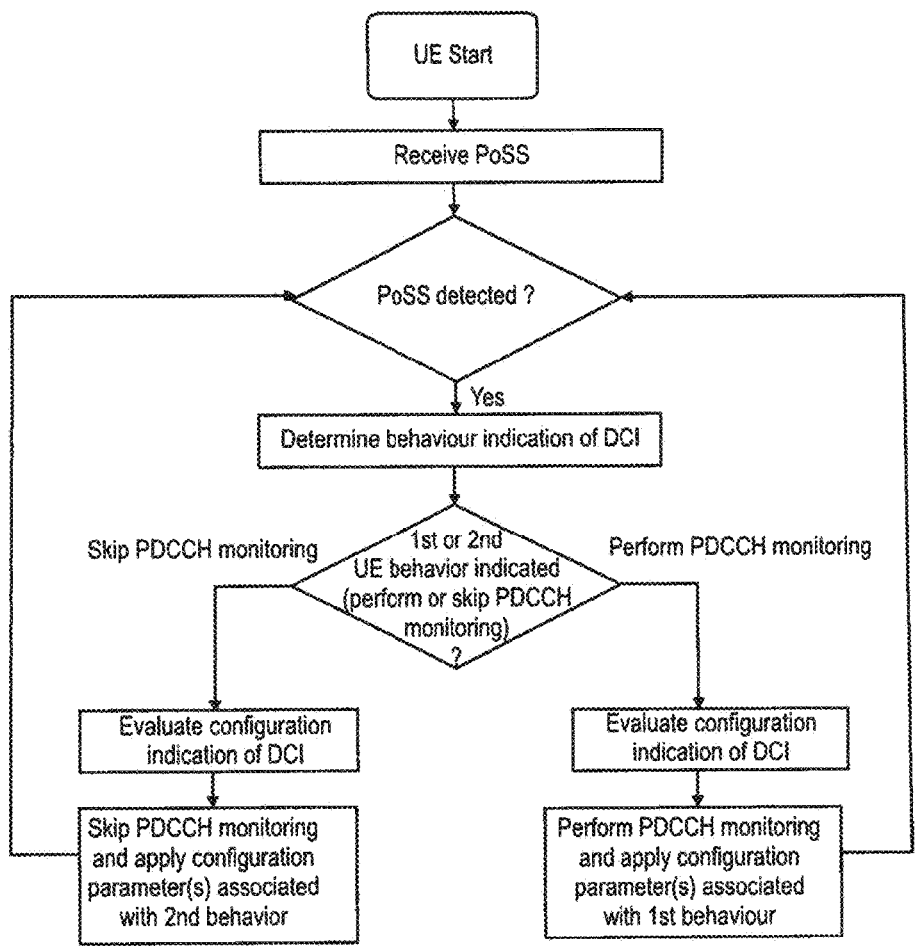
FIG. 6 is a flow diagram for the behavior of a UE, according to an exemplary implementation.

FIG. 6 is a sequence diagram for the UE behavior according to this improved power saving procedure.

It is exemplarily assumed that the UE is in an idle mode, but it is also possible that the UE is in a connected mode. The radio cell the UE is currently camping on is exemplarily termed in the following serving radio cell, controlled by a serving base station.

As shown in FIG. 6, the UE first receives the POSS and ascertains that it has received the POSS correctly. Next, the UE determines the behavior indication of the POSS. Two possible behaviors may be indicated: A first behavior may include to perform PDCCH monitoring, whereas a second behavior may include skipping the PDCCH monitoring and thus saving energy. Depending on which behavior is indicated, the UE next evaluates the configuration indication of the POSS and accordingly either performs the PDCCH monitoring and applies the configuration parameter(s) associated with the first behavior. Otherwise, the UE evaluates the configuration indication of the DCI and skips the PDCCH monitoring. In this case, the UE applies the configuration parameter(s) associated with the second behavior.

The process may return to the step of checking whether a PoSS is detected.

Figure 7:
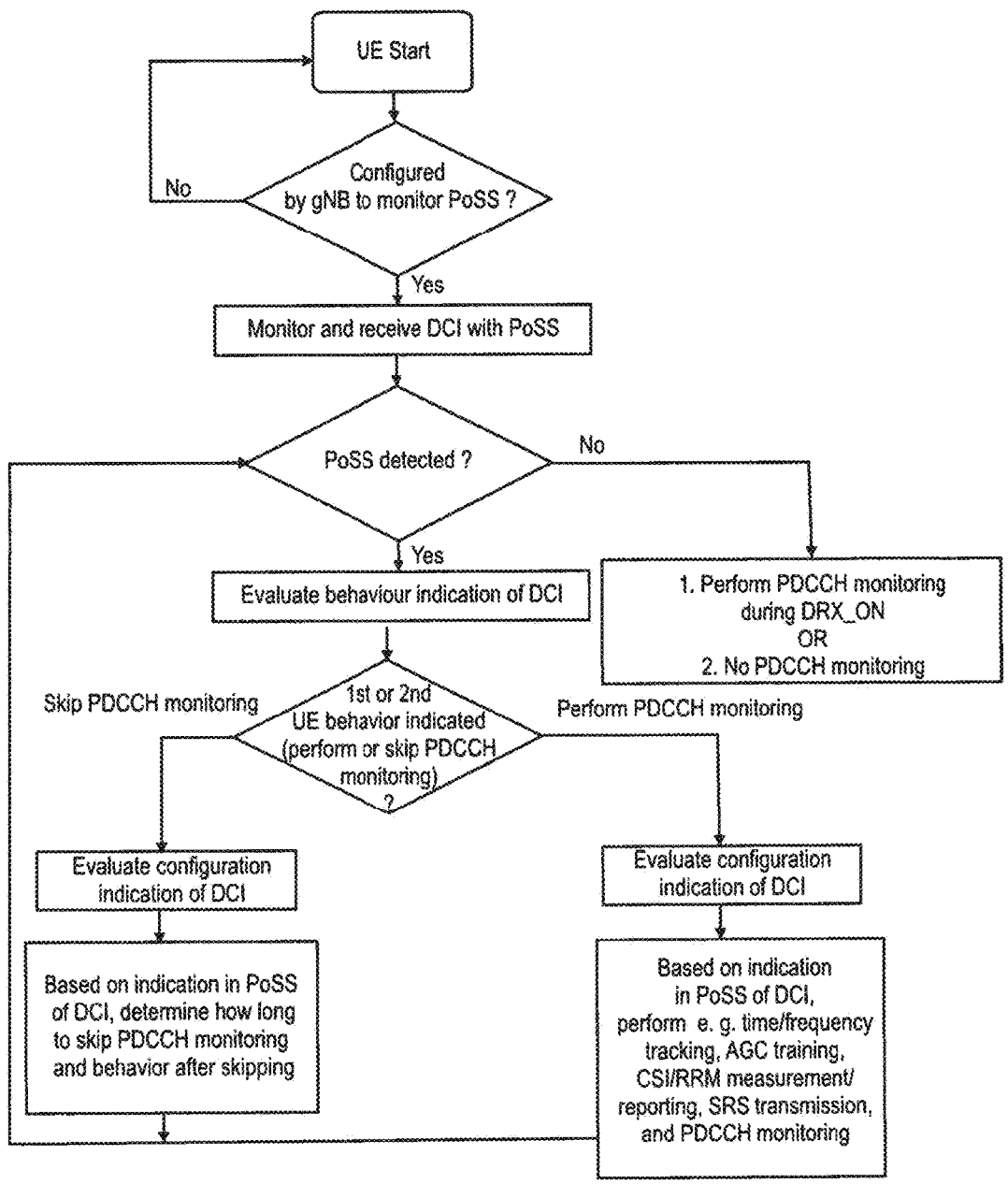
FIG. 7 is a flow diagram for the behavior of a UE, according to another exemplary implementation.

FIG. 7 shows a sequence diagram for the UE behavior according to another exemplary improved power saving procedure. In a first step, it has to be ascertained that the UE is configured by the base station to monitor power saving signals, PoSS. If not, the process goes back to the startup procedure. On the other hand, if the UE is configured to monitor the PoSS, in the next step the UE receives and monitors for receiving the POSS, which according to an exemplary implementation may be in the form of a DCI. In case no PoSS is detected, the UE performs a default behavior. In an exemplary implementation, the default behavior is defined as the behavior in case the POSS is misdirected by the UE. Then, the UE has no behavior indication from the POSS DCI. In particular, it is shown in the flow diagram that in case no PoSS is detected, the UE may have two different possibilities of a default behavior. If the UE is in a state of Discontinuous Reception, DRX, where it is ON ("DRX_ON"), the UE may just perform regular PDCCH monitoring. Alternatively, the default behavior in case no PoSS is detected may also be not to monitor PDCCH during DRX_OFF.

In case that a PoSS is detected, the UE evaluates a behavior indication comprised in the DCI of the POSS. From this behavior indication, the UE determines whether the indicated UE behavior is to skip PDCCH monitoring or to perform PDCCH monitoring. If the behavior indication indicates that PDCCH monitoring is to be performed, a configuration indication of the DCI is evaluated and configuration parameters which are associated with a first behavior are applied. According to the present embodiment, the first behavior involves monitoring of the PDCCH and thus does not provide any energy saving features.

On the other hand, if the behavior indication indicates that PDCCH monitoring is to be skipped, the evaluation of the configuration indication induces the UE to apply at least one configuration parameter associated with a second behavior. The second behavior is associated with energy saving and in particular comprises skipping the PDCCH monitoring.

The process may return to the step of checking whether a PoSS is detected.

Figure 8:
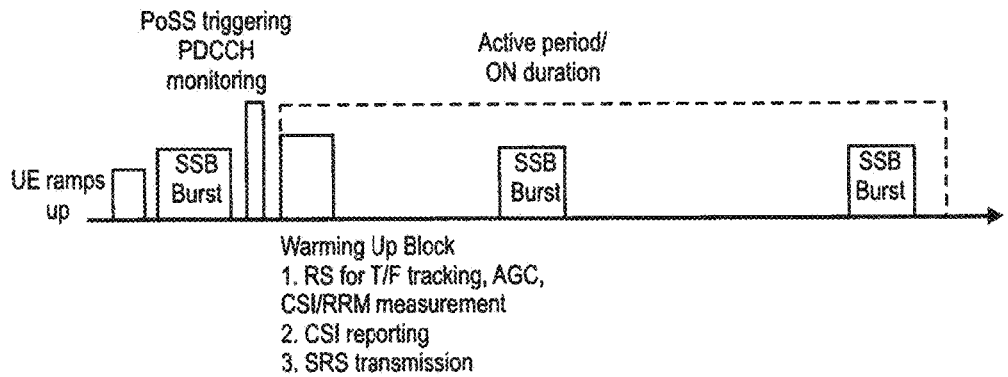
FIG. 8 is a timing diagram for the behavior of a UE, according to an exemplary implementation of a first behavior.

FIG. 8 illustrates the first behavior of the UE in a timing diagram according to an exemplary aspect. According to this embodiment, the UE monitors a power saving signal, PoSS, which may also be referred to as a power saving channel, in the configured resource.

As will be explained later in more detail, the first behavior comprises generally triggering the UE to start monitoring PDCCH. If no triggering is detected, the UE default behavior may for instance be not to receive and decode PDCCH. This means that the base station may need to schedule the UE shortly. To facilitate saving power, the interval between this indication and a real scheduling can be as short as possible. To this end, the UE needs to start performing time/frequency tracking, automatic gain control, AGC, training, Channel State Information, CSI/Radio Resource Management, RRM, measurement and reporting, and Sounding Reference Signal, SRS, transmission. In this way, the base station acquires the downlink/uplink, DL/UL, channel conditions timely and is able to start scheduling shortly. Then, the total UE active time can be shortened which saves power. Furthermore, in order to save power, PDCCH monitoring can be reduced by further indication of the Control Resource Set, CORESET, the search space information, and/or a set of slots.

As schematically and exemplarily depicted in the diagram of FIG. 8, the UE ramps up before it receives a Synchronization Signal Block, SSB, burst and shortly thereafter the PoSS indicating to start PDCCH monitoring. In a warming up block, the UE receives reference signals, RS, for time and/or frequency tracking, automatic gain control, AGC, Channel State Information, CSI, reference resources, and Radio Resource Management, RRM, reference resources. Furthermore, CSI reporting resources, and finally, Sounding Reference Signal, SRS, transmission resources are available to the UE.

As depicted in FIG. 8, the UE remains active over the next two SSB bursts, and then returns into an inactive state.

Figure 9:
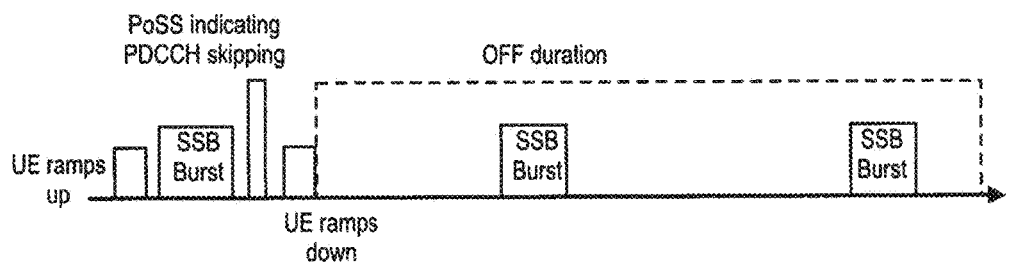
FIG. 9 is a timing diagram for the behavior of a UE, according to an exemplary implementation of a second behavior.

FIG. 9 shows, in contrast to FIG. 8, a timing diagram for the case that the UE receives a PoSS indicating that the UE should skip PDCCH monitoring. This may be called a second behavior of the UE in the present disclosure. In this situation, the UE ramps down after having received the PoSS and remains inactive during the OFF duration. Exemplarily, the OFF duration lasts over more than two SSB bursts.

In particular, the POSS may indicate to the UE to skip PDCCH monitoring until a defined time point. If no PoSS is detected, the default behavior of the UE may be to receive the PDCCH.

For the second behavior, no further time/frequency tracking, AGC training, CSI/RRM measurement/reporting, or SRS transmission is needed. The UE can be instructed that it does not need to receive the PDCCH until a next semi-static DRX cycle, or until the next occasion of receiving a configured PoSS. Alternatively, the UE can be instructed that it does not need to receive the PDCCH in the next X slot, wherein X can be dynamically indicated or semi-statically configured.

Furthermore, besides being instructed that it does not need to receive the PDCCH, the UE may also be indicated that the UE does not need to receive the POSS until a next semi-static DRX cycle, or until the next occasion of receiving a configured PoSS. Alternatively, the UE can be instructed that it does not need to receive the POSS in the next X slot, wherein X can be dynamically indicated or semi-statically configured.

In order to provide a PoSS which is able to indicate the first and second behavior to the UE as required, it is proposed to transmit a PoSS DCI to the UE which allows to integrate the different functionalities of PDCCH monitoring triggering and skipping into one DCI design.

Generally, one DCI is shared by UE behavior indication for both the PDCCH monitoring and triggering. Consequently, the UE only needs to decode one unified PoSS DCI for accessing the further behavior indication. Exemplarily, three concepts can be used to this end, which will be explained below in more detail. Firstly, the detailed UE behavior indication (i.e., configuration) is encoded into a second field, which may be based on the interpretation of a first field. Secondly, the indication for skipping and triggering PDCCH monitoring as well as the configuration indication may be jointly encoded in only one common field. Thirdly, the indication interpretation for skipping or triggering PDCCH monitoring is based on a detected Radio Network Temporary Identifier, RNTI, while the configuration for the indicated behavior is the encoded into another field of the POSS.

Moreover, the POSS DCI may be UE group specific or UE specific. For the UE group specific case, the manner the bitmap is structured may be similar to the existing NR DCI format_*. Each UE may be exemplarily configured with an index to address its own indication within the DCI, and thus allows the UE to determine which indication within the UE-group-specific PoSS is for itself.

Solution 1—First and Second Field

A first exemplary solution of the POSS DCI will now be explained referring to FIG. 10. According to this solution, the DCI comprises a first field and a second field.

The first field comprises, for instance one bit, which indicates to the UE that either the behavior of performing PDCCH monitoring (first behavior), or the behavior of skipping PDCCH monitoring (second behavior) is required. In accordance with the indicated behavior, the UE processes a second field which indicates the configuration associated with the first or second behavior. The second field may be arranged directly consecutive to the respective first field and contains an identifier linked to a previously configured table.

According to one exemplary implementation, the first field indicates regarding the PDCCH monitoring to perform the monitoring or not to perform the monitoring, where the default behavior of the UE is not to monitor the PDC CH. Alternatively, the first field indicates either to skip or not to skip monitoring the PDCCH. In this case, the default behavior is not to skip the PDCCH monitoring.

Figure 10:
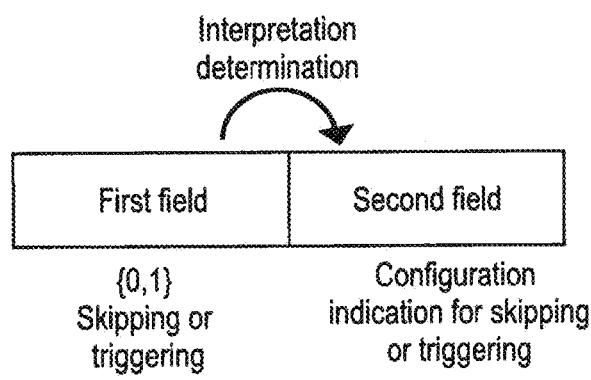
FIG. 10 illustrates a structure of a DCI according to an exemplary implementation of a first solution.

According to the embodiment shown in FIG. 10, a second field is provided in the DCI which is interpreted according to the indication of the first field. The second field comprises a configuration indication which depends on the content of the first field. For instance, if the first field indicates to perform monitoring PDCCH, the UE interprets the second field to indicate at least one configuration related to how to monitor the PDCCH, such as one or a combination of:

Channel State Information (CSI) reference resources,
Radio resource management (RRM) reference resources,
CSI reporting resources,
RRM reporting resources,
Sounding Reference Signal, SRS, transmission resources,
quasi-co-location of CSI/RRM reference resources,
quasi-co-location of CSI report resources, RRM report resources and/or SRS transmission resources,
Control-Resource Set, CORESET information,
Search space information,
a set of slots for PDCCH monitoring,
PoSS monitoring skipping within certain time or frequency resources, meaning e.g., that once the UE is indicated by the POSS to start monitoring the PDCCH, the following PoSS monitoring can be skipped or partially skipped,
Hybrid Automatic Repeat Request-Acknowledgement, HARQ-ACK, resource parameter indication.

For instance, these configuration parameters may be comprised in a first table associated with the first behavior.

On the other hand, if the first field indicates not to monitoring PDCCH, the UE interprets the second field to configure how to skip monitoring the PDCCH, such as, for example, indicating at least one or a combination of the following configurations: skipping PDCCH monitoring and/or PoSS monitoring until the next semi-static DRX cycle, or until the next occasion of a configured power saving signal/channel, or in the next X slots, wherein X is dynamically indicated or semi-statically configured, in case the first field indicates skipping PDCCH monitoring.

These configuration parameters may be comprised in a second table associated with the second behavior.

For both types of indication, the behavior and/or configuration parameter combinations may be configured by radio resource control, RRC.

Figure 11:
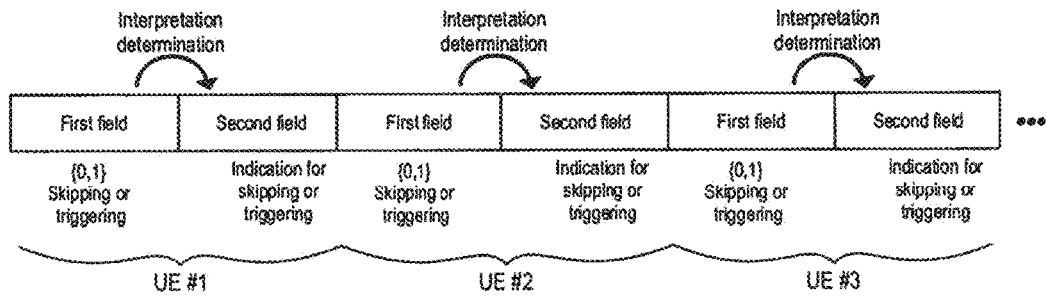
FIG. 11 illustrates a structure of a DCI according to another exemplary implementation of the first solution.

Moreover, as shown in FIG. 11, the present improvement may also be implemented with a UE-group-specific PoSS DCI. Here, the DCI comprises a bitmap pattern, which in each bitmap has a first field and a second field for each UE of one group of UE (e.g., UE #1, UE #2, and UE #3). In FIG. 11, three UEs are depicted exemplarily. However, it is clear for a person skilled in the art, that also more than three UEs may of course also be addressed by this PoSS DCI. As mentioned above, the gNB and the UE might exchange an index value with regard to this group-specific PoSS DCI, so as to allow the UE to determine which one of the various sets o first and second field is intended for itself.

Solution 2—Combined Field

A second exemplary solution of the POSS DCI will now be explained referring to FIG. 12.

According to this solution, the POSS DCI comprises a combined field for behavior indication and configuration indication, either for the first or the second behavior.

Figure 12:
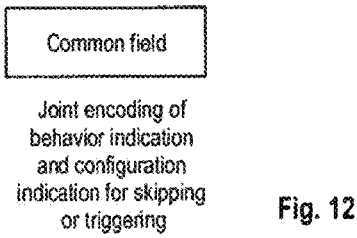
FIG. 12 illustrates a structure of a DCI according to an exemplary implementation of a second solution.

As shown in FIG. 12, the POSS DCI comprises a common field that jointly encodes the information of skipping, triggering, and the related configuration parameters according to the required UE behavior. For instance, the bitmap for a UE may comprise a 3-bit word representing an indication index of a configuration table. Table 1 below depicts an example of such a combined configuration table.

TABLE 1

| Indication index | CSI reference resource | CSI report resource | SRS resource | Quasi-co-location | PDCCH monitoring | HARQ-ACK resource related parameter value |
|---|---|---|---|---|---|---|
| 000 | Resource #a | Resource #1 | Resource #2 | TRUE | TRUE | x |
| 001 | Resource #b | Resource #3 | Resource #4 | TRUE | TRUE | y |
| 010 | Resource #c | Resource #5 | Resource #6 | FALSE | TRUE | z |
| ... | | | | | | |
| 111 | NA | NA | NA | NA | FALSE | NA |

The entries in Table 1 may be configured e.g., by RRC. As mentioned above, the respective bitmap in the common field selects one line and, consequently, one set of configuration parameters and the behavior (column "PDCCH monitoring" being TRUE or FALSE).

As shown in Table 1, the number may be unbalanced between those configuration parameters applicable to performing the PDCCH monitoring and those configuration parameters relating to the case of skipping the PDCCH monitoring. Overall, the joint encoding in the common field shown in FIG. 12 allows for a reduced overhead compared, e.g., to the above described Solution 1.

The present improvement may also be implemented with a UE group-specific PoSS DCI. According to FIG. 13, the POSS DCI comprises a bitmap pattern which has a combined field for each UE of one group of UE (e.g., UE #1, UE #2, and UE #3). In FIG. 11, three UEs are depicted exemplarily. However, it is clear for a person skilled in the art, that only one UE or more than three UEs may of course also be addressed by this PoSS DCI.

Figure 13:
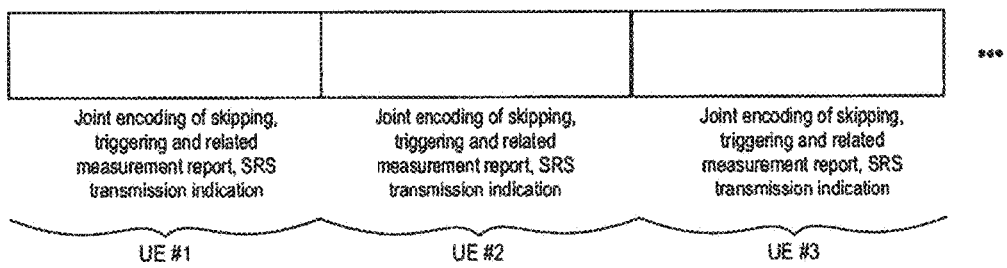
FIG. 13 illustrates a structure of a DCI according to another exemplary implementation of the second solution.

As shown in FIG. 13, the POSS DCI comprises a bitmap for each UE of one group that jointly encodes the information of skipping, triggering, and the related configuration parameters according to the required UE behavior. For instance, the bitmap for each UE may comprise a 3-bit word representing an indication index of a configuration table. Table 1 depicts an example of such a combined configuration table.

Solution 3—Using RNTI and PoSS DCI Field

A third exemplary solution of the POSS DCI will now be explained referring to FIG. 14. According to this solution, the DCI comprises a field comprising an indication indicating the configuration in case of the first behavior, or a field comprising an indication indicating the configuration in case of the second behavior. Furthermore, according to the third embodiment, different RNTIs are used for indicating the intended behavior as well as for addressing the particular UE.

For instance, different RNTIs are used for masking the Cyclic Redundancy Check (CRC) value of the POSS DCI depending on whether PDCCH monitoring is to be performed or skipped.

Figure 14:
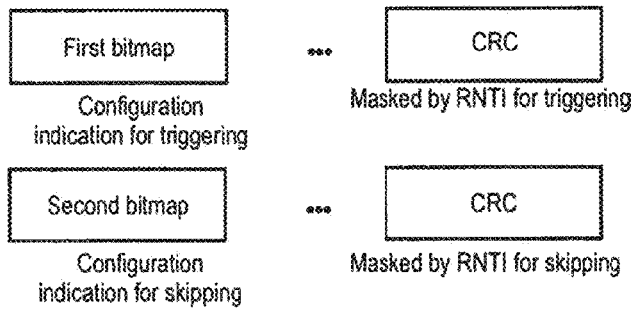
FIG. 14 illustrates a structure of a DCI according to an exemplary implementation of a third solution.

As shown in FIG. 14, within the DCI of the detected PoSS the CRC is transmitted together with a field containing the indication of at least one particular configuration parameter associated with either the first or the second behavior. The field may for instance comprise 3 bits.

For instance, if the CRC descrambling check reveals an RNTI correlated with skipping the PDCCH monitoring, the UE interprets the indication field in the POSS DCI as an indication of configuration parameters related to skipping the PDCCH monitoring. For instance, the UE knows how long it can remain in a sleep mode.

On the other hand, if the CRC descrambling check reveals an RNTI correlated with performing the PDCCH monitoring, the UE interprets the indication in the POSS DCI as indicating a configuration associated with the first behavior. For instance, the UE accesses a table as shown below as Table 2 and retrieves a set of configuration parameters and then knows where to transmit CSI report and SRS transmission and then starts PDCCH monitoring. It is also possible that an update is performed.

TABLE 2

| Indication index | CSI reference resource | CSI report resource | SRS resource | Quasi-co-location | HARQ-ACK resource related parameter value |
|---|---|---|---|---|---|
| 000 | Resource#a | Resource#1 | Resource#2 | TRUE | x |
| 001 | Resource#b | Resource#3 | Resource#4 | TRUE | y |
| 010 | Resource#c | Resource#5 | Resource#6 | FALSE | z |
| ... | | | | | |
| 111 | NA | NA | NA | NA | NA |

The configuration entries for the triggering or skipping indication may for instance be configured by RRC together with the particular first and second RNTIs relating to the first and second behavior, respectively.

Figure 15:
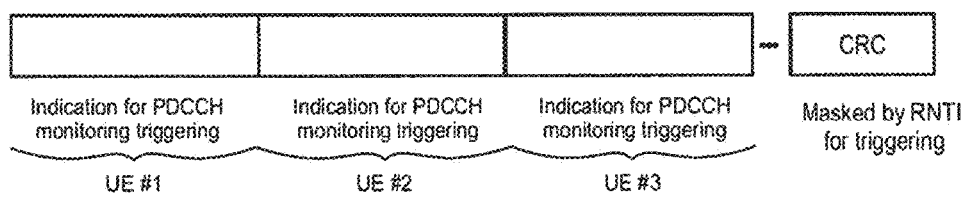
FIG. 15 illustrates a structure of a DCI according to another exemplary implementation of the third solution.
Figure 15:
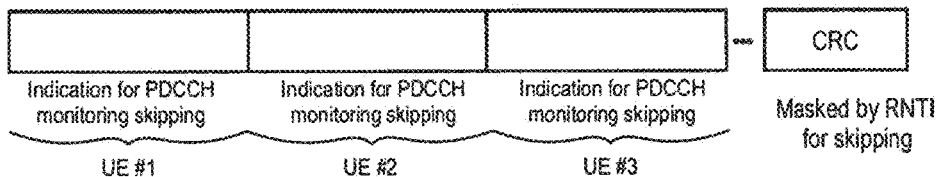

The present improvement may also be implemented with a UE-group-specific PoSS DCI, as shown in FIG. 15. According to this embodiment, the DCI comprises a bitmap pattern, which in each bitmap has a field for each UE of one group of UE (e.g., UE #1, UE #2, and UE #3). In FIG. 15, three UEs are depicted exemplarily. However, it is clear for a person skilled in the art, that only one UE or more than three UEs may of course also be addressed by this PoSS DCI. Furthermore, according to the third embodiment, different RNTIs are used for indicating the intended behavior as well as for addressing the particular UE.

The respective UE of each group accesses the proper field according to the serial position of this field in the complete bitmap pattern based on a previously defined index.

Further Aspects

According to a first aspect, a user equipment is provided, which comprises a receiver, which in operation, receives power saving signals, PoSS, from a serving base station on which the UE is camping, processing circuitry, which, in operation, monitors the reception of PoSS to determine a UE behavior regarding processing of a physical downlink control channel, PDCCH, wherein the POSS comprises a behavior indication indicating for the UE to follow a first behavior or a second behavior, and wherein the POSS further comprises a configuration indication indicating at least one configuration parameter associated with the first or second behavior, and wherein the processing circuitry, in operation, determines to perform PDCCH monitoring in case the first behavior is indicated and to skip PDCCH monitoring in case the second behavior is indicated, and accordingly applies the at least one configuration parameter.

According to a second aspect provided in addition to the first aspect, in case the first field indicates performing PDCCH monitoring, the at least one configuration parameter comprises at least one or a combination of:
Channel State Information (CSI) reference resources,
Radio resource management (RRM) reference resources,
CSI reporting resources,
RRM reporting resources,
Sounding Reference Signal, SRS, transmission resources,
quasi-co-location of CSI/RRM reference resources,
quasi-co-location of CSI report resources, RRM report resources and/or SRS transmission resources,
Control-Resource Set, CORESET information,
Search space information,
a set of slots for PDCCH monitoring,
PoSS monitoring skipping,
Hybrid Automatic Repeat Request-Acknowledgement, HARQ-ACK, resource parameter indication.

According to a third aspect provided in addition to the first or second aspect, the at least one configuration parameter comprises one of skipping PDCCH monitoring and/or PoSS monitoring until the next semi-static DRX cycle, or until the next occasion of a configured power saving signal/channel, or in the next X slots, wherein X is dynamically indicated or semi-statically configured, in case the first field indicates skipping PDCCH monitoring.

According to a fourth aspect provided in addition to any of first to third aspects, the UE, in operation, selects the at least one configuration parameter from a configuration table, optionally, wherein the configuration table is configured by radio resource control, RRC.

According to a fifth aspect, provided in addition to any of first to fourth aspects, the PoSS received by the UE comprises behavior indication and/or configuration indication for a group of UEs.

According to a sixth aspect, provided in addition to any of first to fifth aspects, the PoSS is received as a downlink control information, DCI, wherein the DCI comprises at least one first field for the behavior indication, the first field containing a value that indicates the first or second behavior, and wherein the DCI comprises at least one second field for the configuration indication, the second field containing a value that, dependent on the value of the first field, is interpreted as indicating the at least one configuration parameter associated with the first or second behavior.

According to a seventh aspect provided in addition to the sixth aspect, the first field indicates to the UE to start PDCCH monitoring or not to start PDCCH monitoring, the default behavior being not to start PDCCH monitoring, or wherein the first field indicates to the UE to skip PDCCH monitoring or not to skip PDCCH monitoring, the default behavior being not to skip PDCCH monitoring.

According to an eighth aspect provided in addition to the first to fifth aspect, the PoSS is received as a downlink control information, DCI, and wherein the behavior indication and the configuration indication are jointly encoded in a common field of the DCI.

According to a ninth aspect, which is provided in addition to the eighth and fourth aspect, the content of the common field comprises a bitmap that is used by the UE to select the at least one configuration parameter, wherein the configuration table comprises the behavior indication and the configuration indication.

According to a tenth aspect, which is provided in addition to the first to fifth aspect, the POSS is received as a downlink control information, DCI, and wherein the behavior indication is encoded as a first or second radio network temporary identifier, RNTI, masking a cyclic redundancy check, CRC, value of the DCI, wherein the RNTI identifies the UE and indicates the first or second behavior.

According to an eleventh aspect, which is provided in addition to the tenth and fourth aspect, the DCI comprises at least one bitmap which is used by the UE to select the at least one configuration parameter from the configuration table.

According to a twelfth aspect, a method is provided comprising the following steps performed by a user equipment: receiving power saving signals, PoSS, from a serving base station on which the UE is camping, monitoring the reception of PoSS to determine a UE behavior regarding processing of a physical downlink control channel, PDCCH, wherein the PoSS comprises a behavior indication indicating for the UE to follow a first behavior or a second behavior, and wherein the POSS further comprises a configuration indication indicating at least one configuration parameter associated with the first or second behavior, and wherein the processing circuitry, determines to perform PDCCH monitoring in case the first behavior is indicated and to skip PDCCH monitoring in case the second behavior is indicated, and accordingly applies the at least one configuration parameter.

According to a thirteenth aspect, a base station, BS, is provided, which comprises a transmitter, which in operation, transmits power saving signals, PoSS, to at least one user equipment, UE, which is camping on the base station, processing circuitry, which, in operation, generates the POSS, wherein the POSS comprises a behavior indication indicating for the UE to follow a first behavior or a second behavior, and wherein the POSS further comprises a configuration indication indicating at least one configuration parameter associated with the first or second behavior, and wherein the POSS is generated to cause the UE to perform PDCCH monitoring in case the first behavior is indicated and to skip PDCCH monitoring in case the second behavior is indicated, and to accordingly apply the at least one configuration parameter.

According to a fourteenth aspect, provided in addition to the thirteenth aspect, in operation, the processing circuitry combines the POSS for a group of UE into a combined bitmap pattern.

According to a fifteenth aspect, provided in addition to the thirteenth or fourteenth aspect, the POSS is transmitted as a downlink control information, DCI, and
  the DCI comprises at least one first field for the behavior indication, the first field containing a value that indicates the first or second behavior, and wherein the DCI comprises at least one second field for the configuration indication, the second field containing a value that, dependent on the value of the first field, is interpreted as indicating the at least one configuration parameter associated with the first or second behavior,
  or the behavior indication and the configuration indication are jointly encoded in a common field of the DCI,
  or the behavior indication is encoded as a first or second radio network temporary identifier, RNTI, masking a cyclic redundancy check, CRC, value of the DCI, wherein the RNTI identifies the UE and indicates the first or second behavior.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device, or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device, or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
   a receiver, which, in operation, receives power saving signals (PoSS) from a serving base station on which the UE is camping; and
   processing circuitry, which, in operation, monitors the reception of PoSS to determine a UE behavior regarding processing of a physical downlink control channel (PDCCH),
   wherein the POSS comprises a behavior indication indicating for the UE to follow a first behavior or a second behavior;
   wherein the processing circuitry, in operation, determines to perform PDCCH monitoring in case the first behavior is indicated and to skip PDCCH monitoring in case the second behavior is indicated; and
   wherein the POSS is received as a downlink control information (DCI), and wherein the behavior indication in a field of the DCI further indicates a third behavior regarding Channel State Information (CSI) measurements.

2. The user equipment (UE) according to claim 1, wherein, in case the behavior indication indicates the first behavior for performing PDCCH monitoring, the POSS further comprises a configuration indication indicating at least one configuration parameter comprising at least one or a combination of:
   Radio resource management (RRM) reference resources,
   CSI reporting resources,
   RRM reporting resources,
   Sounding Reference Signal (SRS) transmission resources,
   quasi-co-location of CSI/RRM reference resources,
   quasi-co-location of CSI report resources, RRM report resources and/or SRS transmission resources,
   Control-Resource Set (CORESET) information, Search space information,
a set of slots for PDCCH monitoring,
PoSS monitoring skipping,
Hybrid Automatic Repeat Request-Acknowledgement (HARQ-ACK) resource parameter indication.

3. The user equipment (UE) according to claim 2, wherein the at least one configuration parameter comprises one of skipping PDCCH monitoring and/or PoSS monitoring until the next semi-static DRX cycle, or until the next occasion of a configured power saving signal/channel, or in the next X slots, wherein X is dynamically indicated or semi-statically configured, in case the behavior indication indicates the second behavior for skipping PDCCH monitoring.

4. The user equipment (UE) according to claim 2, wherein the processing circuitry, in operation, selects the at least one configuration parameter from a configuration table, wherein the configuration table is configured by radio resource control (RRC).

5. The user equipment according to claim 2, wherein content of the field of the DCI comprises a bitmap that is used by the UE to select the at least one configuration parameter from a configuration table.

6. The user equipment (UE) according to claim 1, wherein the POSS received by the UE comprises the behavior indication for a group of UEs.

7. The user equipment (UE) according to claim 1, wherein the behavior indication indicates to the UE to start PDCCH monitoring or not to start PDCCH monitoring, the default behavior being not to start PDCCH monitoring, or wherein the behavior indication indicates to the UE to skip PDCCH monitoring or not to skip PDCCH monitoring, the default behavior being not to skip PDCCH monitoring.

8. The user equipment (UE) according to claim 1, wherein the behavior indication is encoded as a first or second radio network temporary identifier (RNTI) masking a cyclic redundancy check (CRC) value of the DCI, wherein the RNTI identifies the UE and indicates the first or second behavior.

9. The user equipment (UE) according to claim 8, wherein the DCI comprises at least one bitmap which is used by the UE to select at least one configuration parameter from a configuration table.

10. A method comprising the following steps performed by a user equipment (UE):
receiving power saving signals (PoSS) as a downlink control information (DCI) from a serving base station on which the UE is camping;
monitoring the reception of PoSS to determine a UE behavior regarding processing of a physical downlink control channel (PDCCH);
wherein the POSS comprises a behavior indication indicating for the UE to follow a first behavior or a second behavior; and
determining to perform PDCCH monitoring in case the first behavior is indicated and skipping PDCCH monitoring in case the second behavior is indicated;
wherein the behavior indication in a field of the DCI further indicates a third behavior regarding Channel State Information (CSI) measurements.

\* \* \* \* \*